United States Patent [19]

Beckenbach et al.

[11] 4,403,951
[45] Sep. 13, 1983

[54] SHAFT FURNACE FOR BURNING OR FIRING AND SINTERING MATERIAL IN LUMP FORM OR PELLET FORM AND WITH AN INTERNAL BURNER

[76] Inventors: Ulrich Beckenbach, Fontanestr. 13; Helmuth Beckenbach, An den Linden 47, both of D-4005 Meerbusch 1, Fed. Rep. of Germany

[21] Appl. No.: 334,429

[22] Filed: Dec. 24, 1981

[30] Foreign Application Priority Data

Jun. 27, 1981 [DE] Fed. Rep. of Germany ....... 3125320

[51] Int. Cl.³ .................... F27D 1/08; F27D 15/02
[52] U.S. Cl. ...................................... 432/96; 432/79; 432/99; 432/101
[58] Field of Search ................ 432/96, 99, 101, 79

[56] References Cited

U.S. PATENT DOCUMENTS

| 196,056 | 10/1877 | Taylor | 432/101 |
|---|---|---|---|
| 357,456 | 2/1887 | Borden | 432/96 |
| 1,390,884 | 9/1921 | Chaudiere | 432/99 |
| 3,202,405 | 8/1965 | Stanley | 432/99 |
| 3,204,936 | 9/1965 | Beckenbach | 432/79 |
| 3,706,520 | 12/1972 | Grimm et al. | 431/10 |
| 4,151,047 | 4/1979 | Legille et al. | 414/161 |

FOREIGN PATENT DOCUMENTS

| 1095190 | of 0000 | Fed. Rep. of Germany |
| 2449039 | of 0000 | Fed. Rep. of Germany |
| 2042838 | 4/1973 | Fed. Rep. of Germany |

Primary Examiner—John J. Camby
Attorney, Agent, or Firm—Hill, Van Santen, Steadman & Simpson

[57] ABSTRACT

A shaft furnace for burning or firing and sintering material, such as limestone, dolomite, etc in lump or pellet form, in which the cooling air is introduced into the external cooling air duct in the vicinity of the furnace bottom, flows upwardly through duct the air duct and downwards through an internal cooling air duct and then passes from an air outlet of internal cooling air duct positioned in the vicinity of the furnace bottom into a first bustle pipe or the like surrounding the shaft furnace. A combustion air duct is supplied with combustion air from a first bustle pipe. A fuel gas supply line runs within the external cooling air duct.

22 Claims, 11 Drawing Figures

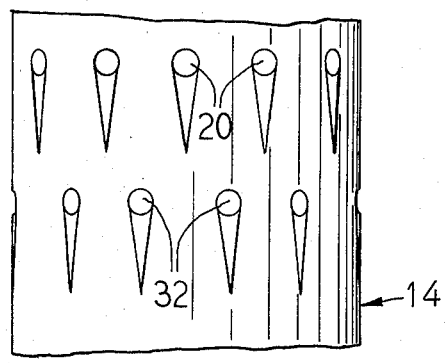
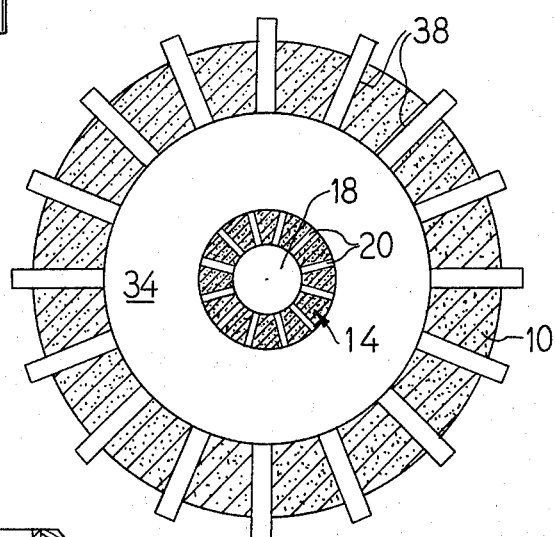
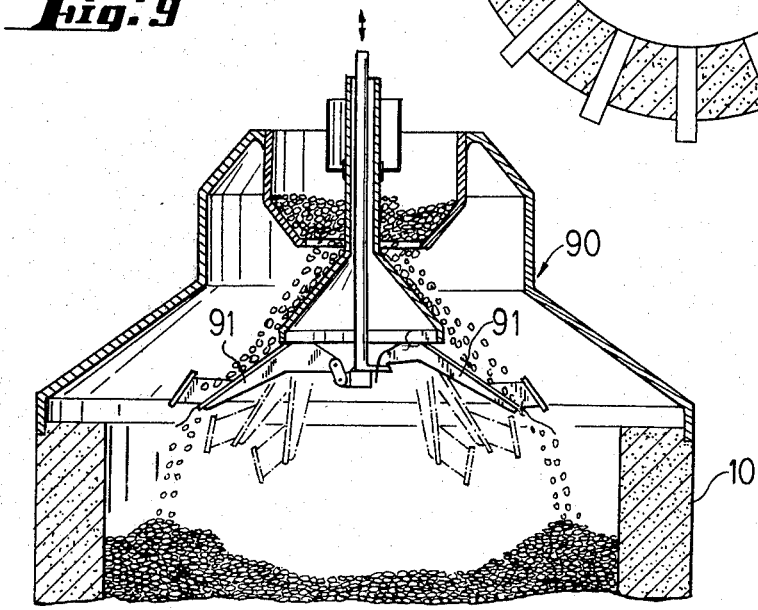

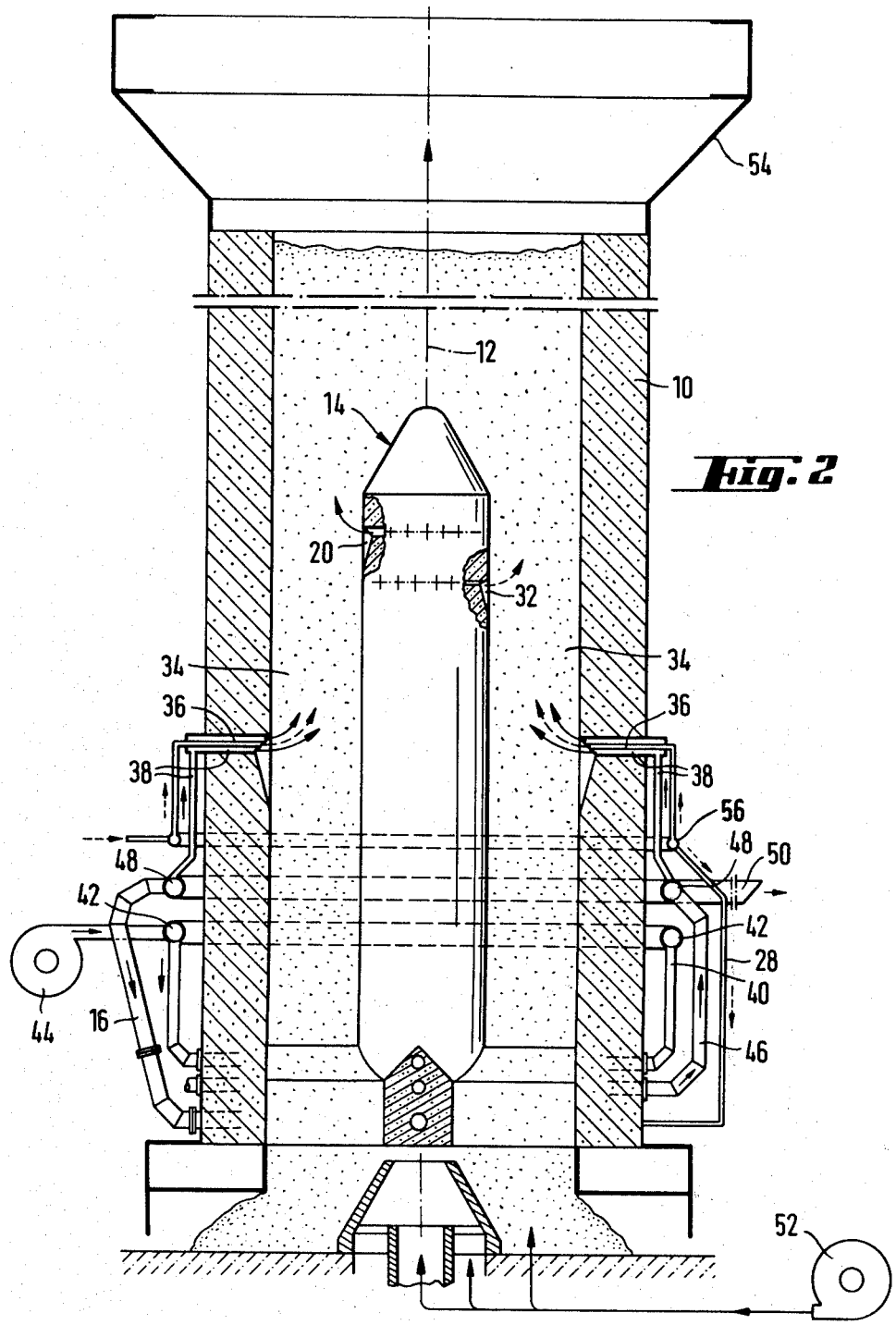

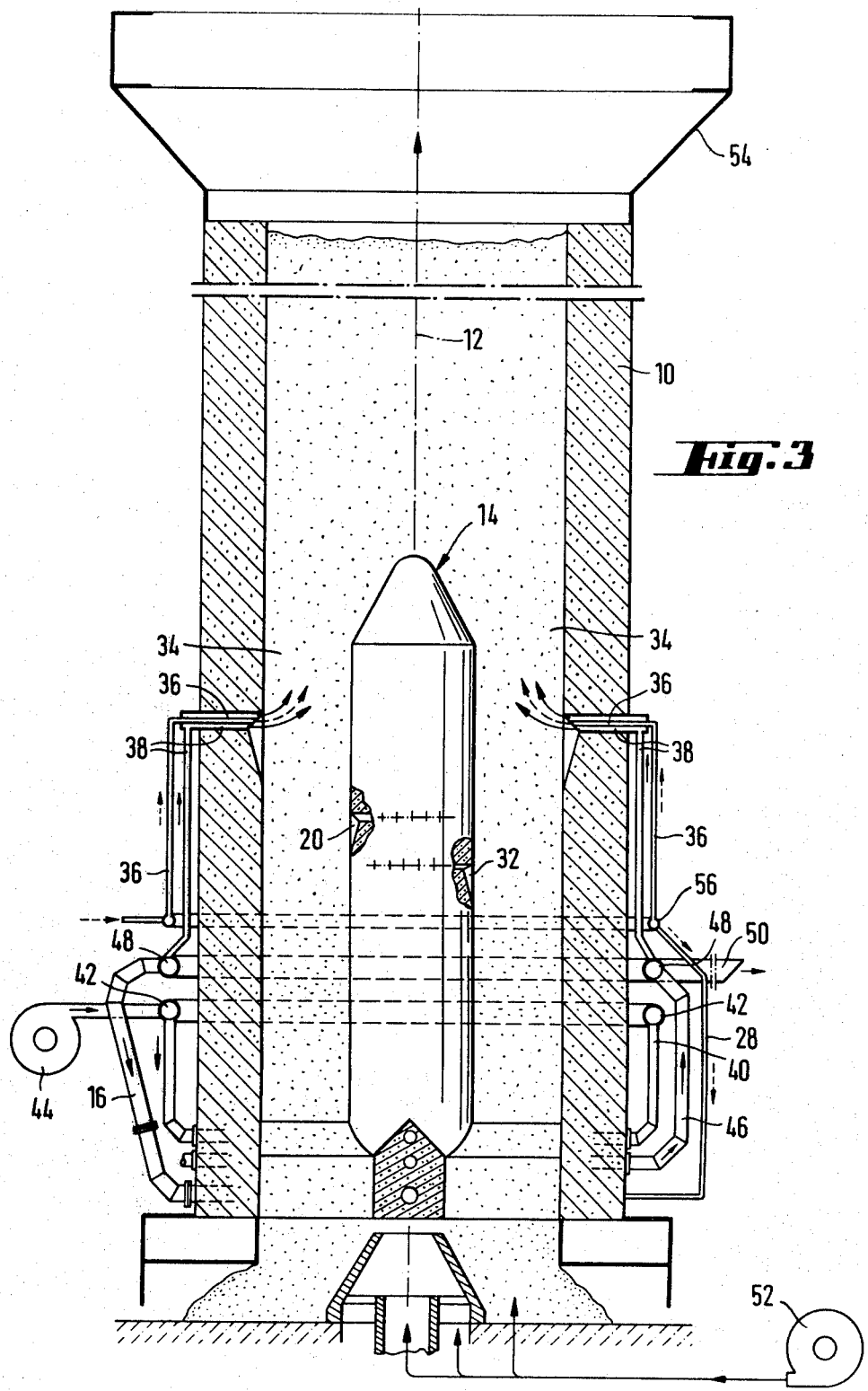

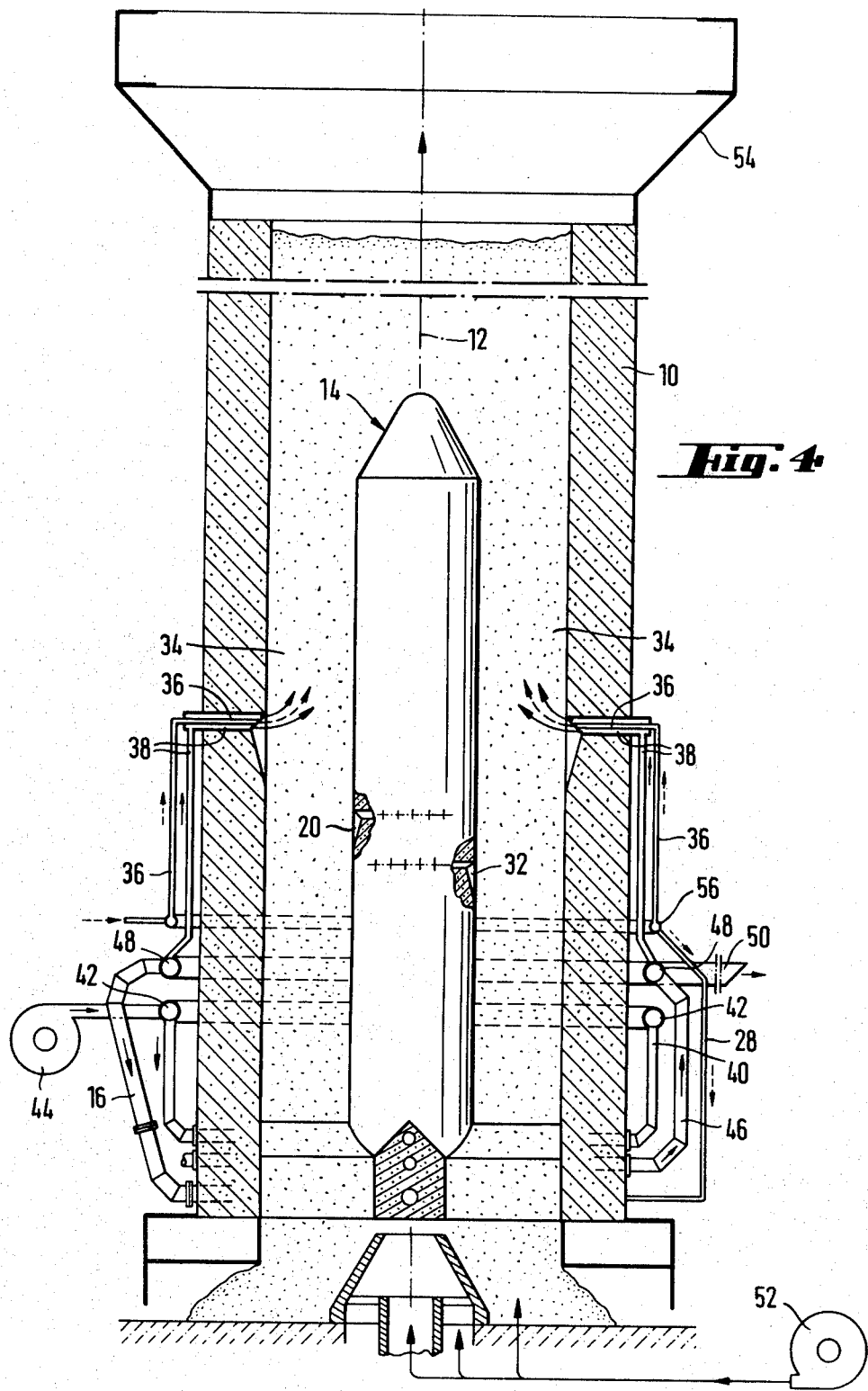

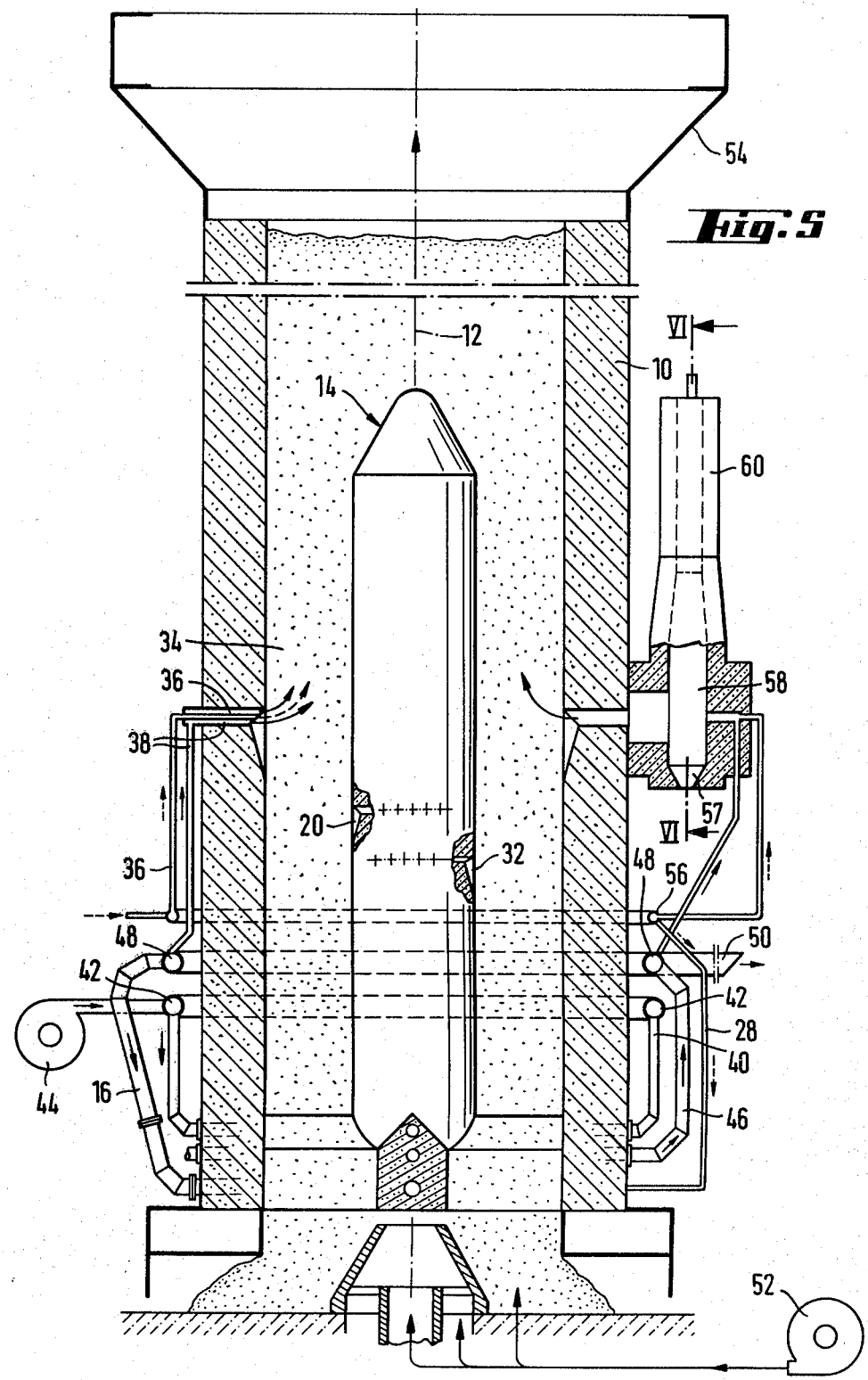

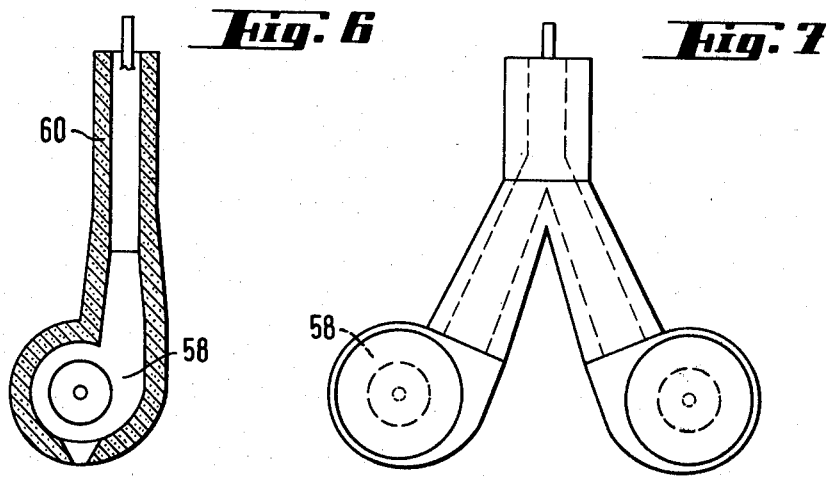
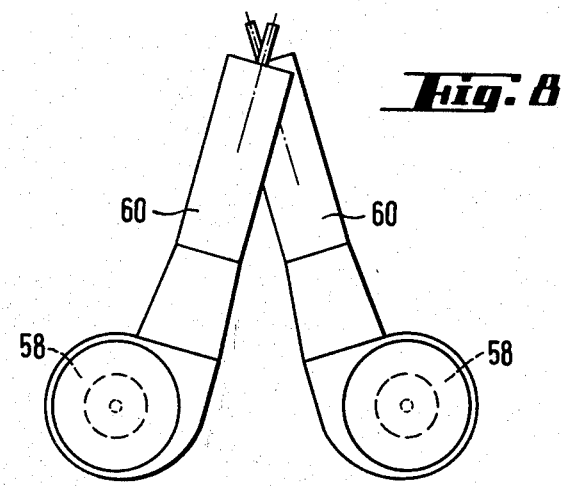

SHAFT FURNACE FOR BURNING OR FIRING AND SINTERING MATERIAL IN LUMP FORM OR PELLET FORM AND WITH AN INTERNAL BURNER

The invention relates to a shaft furnace for burning and sintering material in lump form, which material is selected from a group consisting of limestone, dolomite and the like. The furnace has a furnace shell and an upright internal burner which is arranged centrally in the furnace shell in the vicinity of the furnace bottom and the shell and burner have a substantially rotationally symmetrical cross-section at right angles to the longitudinal axis of the furnace. The said internal burner has in a concentrically positioned manner to one another a central combustion air duct with a combustion air distribution chamber which is arranged in the vicinity of an upper end of the duct and has air outlets which issue laterally into the shaft, an internal cooling air duct surrounding said combustion air duct, an external cooling air duct, which communicates in the vicinity of its upper end with the internal cooling air duct by means of a cooling air deflection chamber, as well as a fuel gas supply, which in the vicinity of whose upper end and below the level of the combustion air distribution chamber has fuel gas outlets, which are below the level of air outlets, which communicate the combustion air distribution chamber with the shaft.

German Pat. No. 2,042,838 discloses a shaft furnace in which a further or additional fuel gas distribution chamber is provided above the combustion air distribution chamber which is at a higher level than the first fuel gas distribution chamber, so that even in the case of fluctuating operating conditions a uniform gas-air ratio is ensured over the entire shaft cross-section.

SUMMARY OF THE INVENTION

The problem or object of the invention is to provide a shaft furnace of the aforementioned type, which brings an improved air and gas supply, a more favourable energy balance and a more uniform heating of the material to be treated.

According to the invention, this problem or object is solved with a shaft furnace of the aforementioned type in that means for introducing cooling air into the external cooling air duct is in the vicinity of the surface bottom, and introduces the cooling air to flow upward through the external cooling air duct and downwards through the internal cooling air duct and then passes from an air outlet of the internal cooling air duct positioned in the vicinity of the furnace bottom into a first bustle pipe or first chamber surrounding the shaft furnace, that a supply line exists for supplying the combustion air duct with combustion air from the first chamber or bustle pipe, and that means for supplying fuel includes fuel gas supply lines being positioned within the external cooling air duct.

Particularly preferred embodiments of the invention can be gathered from the dependent claims. It is of particular advantage if the furnace shell is traversed by a second group or plurality of lateral outlets for fuel/air supply lines, which outlets are preferably concentric, because through the combination of the combustion and gas supplies obtained in this way a particularly uniform heating of the material to be treated can be obtained. As a result, in the shaft furnace according to the invention, the maximum possible use of preheated combustion air ensures a particularly favourable energy balance.

Further features and advantages of the invention can be gathered from the claims and the following description in which four embodiments are illustrated.

BRIEF DESCRIPTION OF THE DRAWINGS

FIG. 1a is an enlarged side view of the central burner illustrated in FIG. 1;

FIG. 1b is a diagrammatic cross-sectional view with portitons removed for purposes of illustration taken generally along both the plane of the air outlets in the outer shell and the air outlets of the central burner of FIG. 1;

FIG. 2 is a longitudinal cross-sectional view with portions omitted for purposes of illustration of a second embodiment of the shaft furnace according to the invention.

FIG. 3 is a partial longitudinal cross-sectional view with portions omitted for purposes of illustration of a third embodiment of the shaft furnace according to the invention.

FIG. 4 is a partial longitudinal cross-sectional view with portions omitted for purposes of illustration of a fourth embodiment of the shaft furnace according to the invention.

FIG. 5 is a partial longitudinal cross-sectional view with portions omitted for purposes of illustration of a fifth embodiment of the shaft furnace according to the invention.

FIG. 6 is a cross-sectional view taken along the lines VI—VI of FIG. 5 and illustrates a combustion chamber with a combustion tube.

FIG. 7 is a plan view of an arrangement of two combustion chambers with combustion tubes.

FIG. 8 is a plan view of another arrangement of two combustion chambers with combustion tubes.

FIG. 9 is a vertical cross-sectional view of a charging means with adjustable flaps with different positions illustrated in broken lines.

DESCRIPTION OF THE PREFERRED EMBODIMENTS

Figure 1:
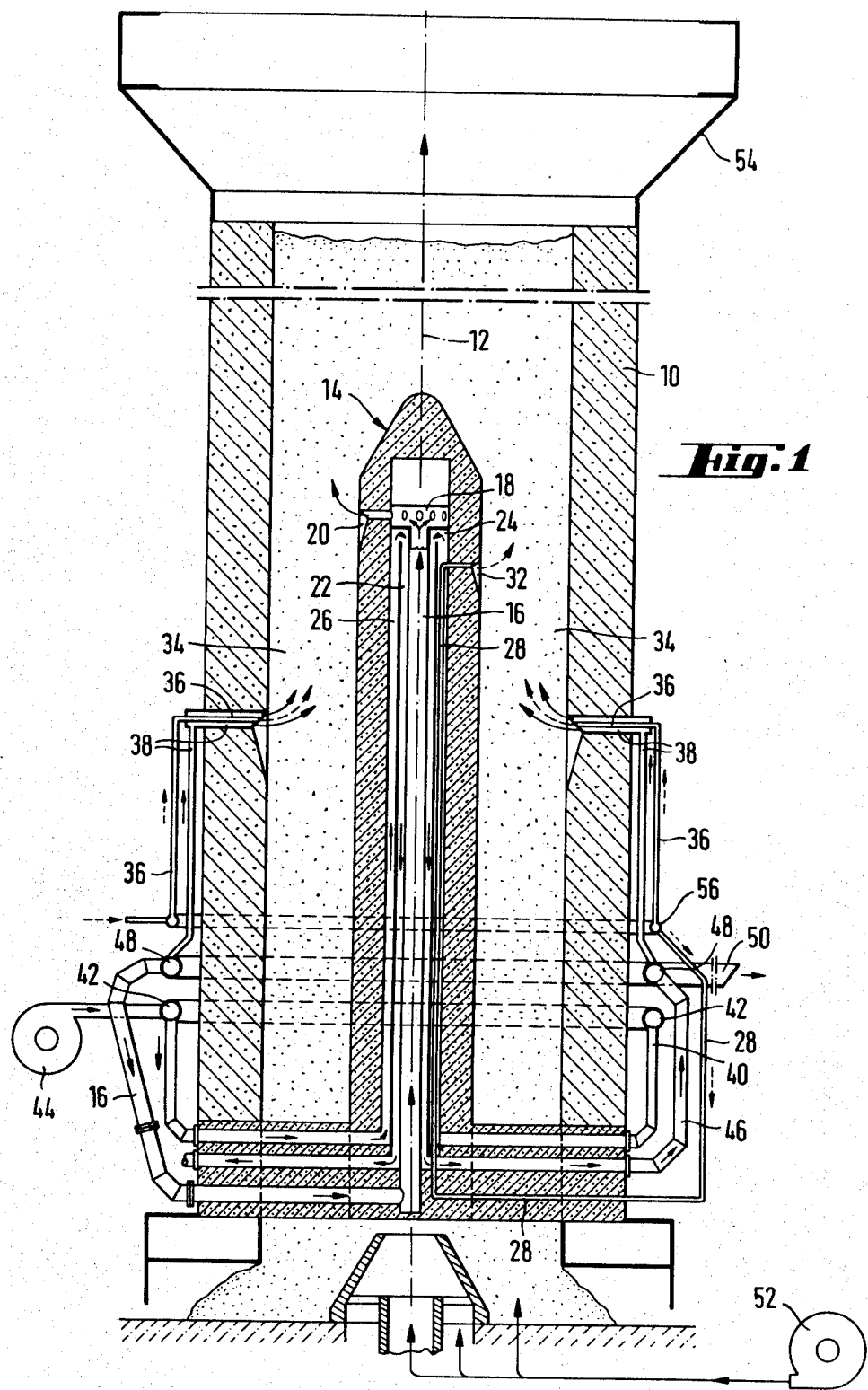
FIG. 1 is a longitudinal cross-sectional view through a first embodiment of a shaft furnace according to the invention.

The lime blast furnace according to the invention shown in FIG. 1 has a furnace shell 10 in which is arranged an internal burner 14, which is rotationally symmetrical to the longitudinal axis 12 of the furnace and which is positioned in the vicinity of the furnace bottom to define an annular space 34 therebetween. Burner 14 projects upwards from the furnace bottom and has a substantially rotationally symmetrical cross-section at right angles to the longitudinal axis 12 of the furnace. Internal burner 14 centrally contains a combustion air duct 16, in the vicinity of whose upper end there is a combustion air distribution chamber 18 having twelve air outlets 20 issuing laterally into the annular space 34. Combustion air duct 16 is concentrically surrounded by an annular internal cooling air duct 22 which, in the vicinity of its upper end, communicates via a cooling air deflection chamber 24 with an external cooling air duct 26, which once again concentrically surrounds the internal cooling air duct 22 in the manner of an annulus. Inside the external cooling air duct 26 there are fuel gas supply lines 28 communicating via twelve fuel gas outlets 32 with the annular space 34 formed between internal burner 14 and an internal wall or surface of furnace shell 10. As illustrated in FIG. a, the air outlets 20 are preferably arranged in a circumferentially displaced manner with respect to the fuel gas outlets 32. Furnace shell 10 is traversed by a second group of sixteen lateral outlets of fuel gas supply lines 36, which outlets are in each case concentricaly surrounded by an outlet of an air supply line 38. The outlets of the second group of the air supply lines 38 are preferably circumferentially spaced from the air outlets 20 of the burner 14 as illustrated in FIG. 1b.

Cold external air is introduced into the external cooling air duct 26 from a second bustle pipe 42 surrounding furnace jacket 10 by a blower 44 and via a supply air line 40 in the vicinity of the furnace bottom. In the external cooling air duct, the cooling air flows upward, is deflected in the cooling air deflection chamber 24 and then flows downward in the internal cooling air duct 22. In the vicinity of the furnace bottom, an exhaust air line 46 branches from the internal cooling air duct 22 and leads to a first bustle pipe 48 surrounding the furnace shell 10 and which has an outlet 50 for excess air. The supply air line 40, like the exhaust air line 46 passes through the four arms of the cross-shaped supporting member of the shaft furnace. A blower 52 shown at the bottom of the drawing is used for the normally necessary cooling by means of air of the material to be treated in the lower part of the furnace. Within the furnace, this air contributes to the combustion of the fuel gas quantities flowing out of the internal burner 14 and he lines 36 and 38. All gases formed during combustion and deacidification above charging platform 54 pass in conventional manner into the atmosphere through chimneys.

In the represented lime shaft furnace, the material to be treated is heated both by means of the refractory lined internal burner 14 set up on the cross-shaped supporting member directly above the discharge mechanism and by means of the second group of combustion outlets passing laterally through the furnace shell 10 and which group comprises the outlets of the fuel gas supply lines 36 and the outlets of the air supply lines 38 which air outlets concentrically surround the latter. According to the invention, both air supply lins 38 and the combustion air duct 16 are supplied with preheated combustion air from the first bustle pipe 48. Due to the fact that the air outlets 20 are positioned above the fuel gas supply lines 28 and are circumferentially displaced relative thereto, an immediate and excessively violent start of the combustion process at the upper end of the internal burner is prevented. A favourable energy balance is ensured by the preheated combustion air discharged through the air outlets 20 from combustion air distribution chamber 18. Compared with the internal burner, the lateral outlets of the fuel gas supply lines 36 only convey a relatively limited quantity of fuel gas into the furnace. Once again, a favourable energy balance is ensured by the use of the combustion air from the first bustle pipe 48, which air is supplied by means of the lateral air supply lines 38. The outlets for the pipes 36 and 38 can be positioned above or below the level of the fuel gas outlets 32 and also above the air outlets 20 of the internal burner 14, as will be shown hereinafter with reference to the further embodiments. It is pointed out that the cooling air supplied by blower 52 within the shaft furnace advantageously contributes to the combustion of the fuel gas quantities flowing out of the fuel gas outlets 32 of internal burner 14 and the lateral outlets of the fuel gas supply lines 36.

As compared with the embodiment of FIG. 1, FIG. 2 shows that it is also possible to have other reciprocal level-based arrangements of the air outlets 20, fuel gas outlets 32 and lateral outlets of the pipes 36, 38. Reference numerals have to a large extent not been described because the other details correspond to the embodiment of FIG. 1, and as also applies with respect to the embodiments of FIGS. 3 and 4, so that in this connection reference should be made to FIG. 1.

The embodiment of FIG. 3 differs from that of FIGS. 1 and 2 in that the fuel gas outlet 32 and air outlets 20 of internal burner 14 pass laterally through the outer wall of internal burner 14, instead of being positioned at the upper end thereof, i.e. at the internal burner tip. Therefore, as illustrated in FIG. 3, both the outlets 20 and 32 of the burner 14 lie below the plane of the second group of concentric outlets for the lines 36 and 38.

The embodiment of FIG. 4 differs from that of FIG. 3, with respect to which it is also pointed out that the second group of concentric outlets for the supply lines 36, 38 passing laterally through furnace shell 10 are located above the level of air outlets 20 and fuel gas outlets 32, in that the internal burner 14 is lengthened. This leads to a long annulus or annular space 34 in the combustion zone, which is favourable for a uniform mixing and combustion action, as well as for a uniform heat transfer.

Optimum effects can be obtained with the shaft furnace according to the invention if, as is all the represented embodiments, the different lateral outlets for the combustion pipes, fuel gas outlets and air outlets are provided in the different arrangements both in the furnace shell 10 and in internal burner 14.

In all the embodiments, the fuel gas can be supplied to the lateral fuel gas supply lines 36 on the one hand and the fuel gas supply line 28 of internal burner 14 on the other from a third bustle pipe 56 surrounding the furnace shell.

FIG. 5 shows an embodiment of the shaft furnace according to the invention in which combustion chambers 58 with combustion tubes 60 mounted thereon are provided. The use of such combustion chambers 58 with or without mounted combustion tubes 60 makes it possible to use non-gaseous fuels.

In the case of gaseous fuels, firing can take place by means of the fuel gas supply line 28 of internal burner 14 and/or fuel gas supply line 36 on the outside of furnace shell 10. In the case of liquid or pulverulent fuel, firing takes place by means of combustion chambers 58 with or without mounted combustion tubes 60 which can have various configurations as illustrated by FIGS. 7 and 8. In this case, internal burner 14 is merely cooled and the discharged heated cooling air is used as partial combustion air for the partially burned fuel leaving combustion chambers 58. Fuel is in particular supplied to the upper end of combustion tube 60 if more difficultly to burn fuels such as e.g. coal dust is used. Outlet 57 can be used for removing the ash.

When firing the furnace exclusively from the edge by charging the furnace by means of adjustable flaps as described in our United States patent application Ser. No. 334,430, filed Dec. 24, 1981 and entitled "Apparatus for charging a shaft furnace", it is possible to construct the bulk material surface in such a way as to obtain an optimum uniform through-gassing of the bulk material to be burnt or sintered. This is accomplished by charging means 90 for charging material into the furnace and the means 90 includes adjustable flaps 91 to enable changing the distribution of the material in the furnace as illustrated in FIG. 9.

The features disclosed in the description, drawings and claims may be essential to the realisation of the various embodiments of the invention, either individually or in random combinations.

We claim:

1. A shaft furnace for burning and sintering material in lump form, which material is selected from a group consisting of limestone, dolomite and the like, said furnace comprising a furnace shell, an upright internal burner being arranged centrally in the furnace shell in the vicinity of the furnace bottom, said furnace shell and burner having substantially rotationally symmetrical cross-sections at right angles to the longitudinal axis of the furnace and defining an annular space therebetween, said internal burner in a concentrically positioned manner to one another having a central combustion air duct with a combustion air distribution chamber being arranged in the vicinity of an upper end of the air duct and having a plurality of air outlets discharging laterally into the annular space, an internal cooling air duct surrounding said combustion air duct, an external cooling air duct surrounding the internal cooling air duct and being in communication therewith in the vicinity of an upper end by means of a cooling air deflection chamber, means for introducing cooling air into a bottom of the external air duct being arranged in the vicinity of the furnace bottom with the cooling air flowing upward through the external cooling air duct and down through the intrnal air duct, said internal cooling air duct having an air outlet being positioned in the vicinity of the furnace bottom and extending to a first container being disposed outside of the shaft furnace, a supply line for supplying the combustion air duct with combustion air from the first container, and means for supply fuel including fuel gas supply lines being positioned within the external cooling air duct and haviang fuel gas outlets in the vicinity of the upper end of each fuel gas supply line and below the level of the air outlets of the combustion air distribution chamber.

2. A shaft furnace according to claim 1 wherein said first container is a first bustle pipe surrounding said shaft furnace and said supply line extends from aid bustle pipe to the combustion air duct.

3. A shaft furnace according to claim 2 wherein the means for introducing cooling air includes a second bustle pipe surrounding the furnace shell and supply lines extending from aid second bustle pipe to the bottom of the external air duct.

4. A shaft furnace according to claim 1 which includes a second group of air supply lines having outlets extending through the furnace shell into said annular space, and a second group of fuel supply lines having outlets extending laterally through the furnace shell for discharging into said annular space.

5. A shaft furnace according to claim 4 wherein the first chamber is a first bustle pipe surrounding the shaft furnace and the second group of air supply lines is connected to said first bustle pipe.

6. A shaft furnace according to claim 4 wherein the outlets for the second group of fuel supply lines are arranged at a level which is above the level of the air outlets of the internal burner.

7. A shaft furnace according to claim 4 wherein the second group of outlets for the fuel gas supply lines are arranged at a level below the level of the air outlets of the intrnal burner.

8. A shaft furnace according to claim 7 wherein the second group of outlets for the fuel gas supply lines are positioned above the level of the gas outlets of the internal burner.

9. A shaft furnace according to claim 7 wherein the level of the second group of outlets for the fuel gas supply lines is positioned below both the level of the fuel gas outlets and the air outlets of the internal burner.

10. A shaft furnace according to claim 1 wherein the air outlets of the internal burner are arranged in a circumferentially displaced manner with respect to the fuel gas outlets of the burner.

11. A shaft furnace accordiang to claim 1 which includes a second group of fuel gas supply lines disposed on the outside of the furnace shell and having outlets extending laterally through the furnace shell for discharging into the annular space, said outlets of said second group of supply lines being circumferentially displaced relative to the fuel gas outlets of the internal burner.

12. A shaft furnace according to claim 1 which includes a second group of fuel gas supply lines disposed on the outside of said furnace shell and having outlets extending through the wall of said furnace shell, said outlets of said second group of supply lines being circumferentially displaced with respect to the air outlets of the internal burner.

13. A shaft furnace according to claim 1 which includes a second group of fuel gas supply lines disposed on the outer surface of the furnace shell having outlets extending laterally through the furnace shell for discharge into the annular space.

14. A shaft furnace according to claim 13 wherein each of the outlets of the second group has concentrically arranged within an air discharge outlet extending to a source of combustion air and each of the fuel gas supply lines extending to a source of flammable gas.

15. A shaft furnace according to claim 13 wherein each of the outlets of the second group of lateral fuel supply lines is provided with a combustion chamber having means supplying fuel and a combustion air thereto.

16. A shaft furnace according to claim 15 wherein the means for supplying fuel supplies an easily burnable fuel directly to the combustion chamber, said fuels being selected from a group consisting of liquid fuels and light oils.

17. A shaft furnace according to claim 15 wherein the means for supplying fuel supplies difficult to burn materials such as solid fuels and wherein each combustion chamber includes means for removing ash.

18. A shaft furnace according to claim 13 wherein the first chamber is a bustle pipe surrounding said chamber, each of said second group of outlets having an air supply line extending from said bustle pipe to an air outlet concentrically arranged to the outlet of the fuel supply line.

19. A shaft furnace according to claim 1 wherein said first chamber comprises a first bustle pipe surroundiang said furnace and having an air outlet for excess cooling air.

20. A shaft furnace according to claim 1 wherein the first chamber is a first bustle pipe, where the means for introducing cooling air includes a second bustle pipe connected to the bottom of the external air duct, said means for a fuel supply includes a third bustle pipe connected to the fuel gas supply line.

21. A shaft furnace according to claim 20 which includes a second group of fuel gas supply lines connected to said third bustle and terminating in outlets extending laterally through the furnace shell to discharge into the annular space.

22. A shaft furnace according to claim 1 which includes charging means for charging material to said furnace, said charging means including adjustable flaps to enable changing the distribution of material in said furnace.

* * * * *